United States Patent Office 3,244,686
Patented Apr. 5, 1966

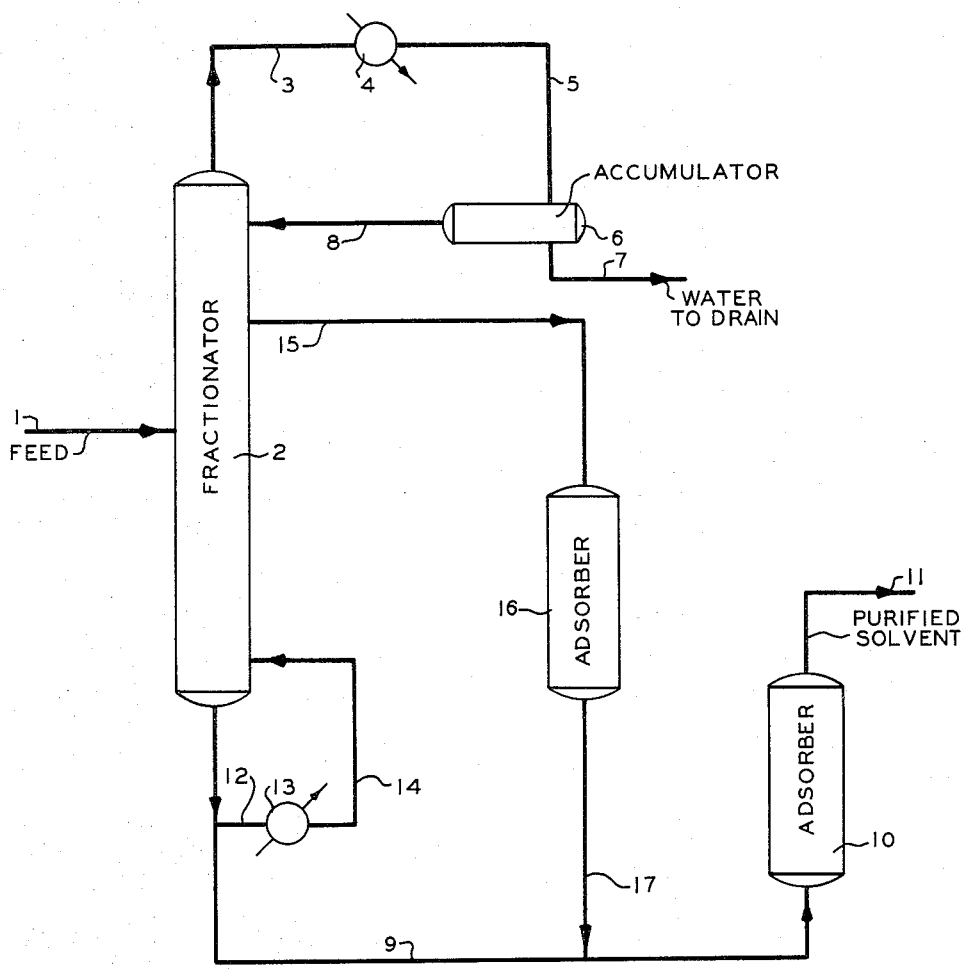

3,244,686
SOLVENT PURIFICATION IN THE POLYMERIZATION OF BUTADIENE
Donald M. Haskell and Glenn H. Dale, Bartlesville, Okla., assignors to Phillips Petroleum Company, a corporation of Delaware
Filed Dec. 11, 1961, Ser. No. 158,221
14 Claims. (Cl. 260—94.3)

This invention relates to a method for purifying a solvent. It also relates to an apparatus for purifying a used solvent. In one of its aspects, this invention relates to the removal of materials poisonous to a catalyst from a solvent which is employed in a catalytic operation by fractionating said solvent to produce a low boiling vaporous product and a high boiling residual product consisting essentially of solvent and an intermediate boiling fraction taken from the fractionation at a point at which the catalyst poisons tend to concentrate. In another of its aspects, the invention relates to a method as described wherein a minor portion of a solvent stream containing catalyst poisons, removed from the fractionation zone according to the invention, is purified and returned to the system for reuse. In a still further aspect of the invention as it is exemplified in its application to the purification of a solvent employed in the catalytic polymerization of butadiene to form a polybutadiene the used solvent is passed to a drying column, water is removed as an overhead stream, an intermediate stream is removed and purified with silica gel to remove catalyst poisons and then recombined with a bottoms stream consisting essentially of solvent which is also removed from the column. In a further aspect still, the invention relates to an apparatus comprising a drying vessel, a vessel containing a catalyst poison adsorbent or absorbent such as a treating solid or liquid, the vessel having means for removing a low boiling vaporous fraction, means for removing an intermediate fraction comprising solvent and catalyst impurities and means for removing a bottoms product.

In Serial Number 578,166, filed April 16, 1956, by David R. Smith and Robert P. Zelinski, there is described and claimed a method for the production of a 1,3-butadiene polymer product which comprises contacting said 1,3-butadiene with a catalyst consisting essentially of a compound corresponding to the formula $R_3Al$, wherein R is an alkyl radical containing up to and including 6 carbon atoms and titanium tetraiodide. Catalyst consisting essentially of triisobutylaluminum, triethylaluminum, triisopropylaluminum, or tripropylaluminum or mixtures thereof with titanium tetraiodide as the other component are included.

Diluents or solvents include aromatics, such as benzene, toluene, xylene, ethylbenzene and mixtures thereof. Also included are straight and branched chain paraffins containing up to and including 10 carbon atoms per molecule. For example, propane, normal butane, normal pentane, isopentane, normal hexane, isohexane, 2,2,4-trimethylpentane (isooctane), normal decane, and the like, may be used. Mixtures of these paraffinic hydrocarbons can also be employed as diluents in the practice of the process of that invention. Also, cycloparaffins, such as cyclohexane, can also be used. Further, mixtures of any of the aforementioned hydrocarbons can also be employed as solvents or diluents.

During the polymerization operation wherein the 1,3-butadiene is polymerized to a rubbery polymer employing a catalyst system as described and a diluent as described there accumulates in the diluent or solvent material poisonous to the catalyst system. This material includes water and other impurities which are effective to reduce the activity of the catalyst. Accordingly, it is necessary to purify the solvent if it is to be reused. Thus, in the production of a product containing a rubbery polymer of 1,3-butadiene characterized by at least 85 percent of cis 1,4-addition using, say, toluene as a solvent it is necessary to treat the recycle toluene solvent by fractionation and alumina adsorption to remove water poisons to the polymerization catalyst system before this toluene can be fed to the reactor.

It has now been found that the fractionator has a tendency, in this instance, to concentrate other poisons as well as water in a top portion of the fractionation column. It has been necessary to discard 1 to 1½ percent or thereabouts of the toluene fed to the column overhead in order to keep the poison level in the kettle product low enough to allow proper operation. For example, if a 12 hour adsorption cycle on the provided alumina guards is desired, there has been discarded overhead a valuable amount of toluene solvent. In the operation of the fractionator there is included in the overhead which it has been found necessary to remove, in order to remove catalyst poisons, not only water but also, for example, isobutyl alcohol formed during the recovery of the polymer. This alcohol is a catalyst poison. Unless the overhead stream is removed the catalyst poisons are forced down into the kettle product.

It has now occurred to us that there can be found a level in the fractionator column at which there can be removed and, therefore, should be removed, a small side stream which will contain the priorly obtained and discarded 1 to 1½ percent of the toluene which has been removed as an overhead cut. This side stream contains a concentration of catalyst poisons such that the kettle product of solvent contains so little poison that the throughput capacity of the adsorbent used is greatly increased. Thus, the side draw of liquid phase which in this instance is taken near the top of the fractionator and which is treated in a bed of silica gel contains concentrated organic poisons as well as a small amount of water which is present. The effluent when it has been treated is combined with the kettle product of the drying column or fractionator ahead of the alumina guard bed or vessel.

It is an object of this invention to provide an improved method for the purification of a solvent. It is another object of this invention to provide an apparatus for the purification of a solvent. It is a further object of this invention to provide an improved method for the purification of a solvent which has been employed in the catalytic polymerization of a hydrocarbon such as 1,3-butadiene to form a rubbery polymer. It is a still further object of this invention to provide a method for increasing the throughput capacity of a guard chamber used to dry and/or to purify a solvent removed as a kettle product from a solvent purification zone.

Other aspects, objects, and the several advantages of this invention are apparent from a consideration of this disclosure, the drawing, and the appended claims.

According to the present invention, a solvent of diluent used in the catalytic polymerization of a hydrocarbon is purified of materials tending to poison the catalyst employed by passing the same to a fractionation zone at an intermediate point thereof, removing water as a low boiling vaporous product from the fractionation zone, removing a major portion of solvent from the fractionation zone as a high boiling product and removing, and if desired purifying, a minor stream of solvent from a point intermediate the points at which the low boiling vaporous product is removed from the fractionation zone and at which solvent is removed therefrom. When treated, the minor stream is then recombined with the high boiling or bottoms product for further use.

Among the advantages of purifying a minor portion taken as a side stream there can be mentioned that the side stream will have a much lower solvent volume and water content. Accordingly, the life and capacity of the silica gel or other adsorbent or absorbent bed or liquid layer, when a liquid is used, are increased. Thus, taking a side draw rather than taking liquid from the column reflux accumulator which contains considerable water avoids having to pass this water into the treating bed. Also, concentrating the organic poisons, as described, at a place in the column, for example, the top of the column as already described, greatly increases the capacity of the guard chamber or adsorbent or other material which is used.

Referring now to the drawing, a used solvent feed 1 enters fractionator 2 from which a vaporous overhead 3 is taken, cooled in cooler 4 and passed by 5 to overhead accumulator 6 from which water is withdrawn to drain at 7. A portion of the accumulated liquid in 6 is passed by 8 to column 2 as reflux therefor. Bottoms which are essentially considerably purified solvent are passed by 9 to adsorber 10 and by 11 to storage or to the polymerization reactor for reuse. Adsorber 10 preferably contains activated alumina but may contain molecular sieve, charcoal, silica gel, or other adsorbent. A portion of the bottoms is passed by 12, heater 13, and by 14 to the bottom of the column to reboil the same. According to the invention, side draw or minor stream 15 is passed to an adsorber 16 and then passed by 17 and 9 to adsorber 10. Adsorber 16 preferably contains silica gel but may contain activated alumina, charcoal or other adsorbent.

It will be seen that the stream 15, in this instance, is taken near the top of the column at which the catalyst poisons, as described, tend to accumulate and that therefore, the silica gel in adsorber 16 will take care of these poisons in a large measure increasing considerably the capacity of the existing alumina adsorber 10 or decreasing the size thereof in the event a new adsorber is built. Nevertheless, and still according to the invention, the size of the silica gel adsorber and its throughput capacity is considerably greater than would be the capacity of an adsorber to which a stream would be passed from accumulator 6.

One skilled in the art in possession of this disclosure will recognize and understand, having studied the same, that without the side draw feature of the invention, the poisons, which boil intermediate the overhead and bottoms products, would concentrate in an intermediate point of the column until forced out in both the overhead and bottoms products at low concentrations. The removal of a low-concentration impurity by adsorption requires a great deal of adsorbent since the capacity of the adsorbent is directly proportional to the concentration of the component being adsorbed. Thus, as a particularly mentioned feature of the invention, it will be seen that not only are the efficiency, capacity, etc., of the adsorbent used on the bottoms stream greatly improved according to the operation, but also, the efficiency of the adsorbent used to treat the side draw stream is also increased because there is fed to it a high concentration of impurities in the side draw stream. Thus, a minimum of adsorbent is used to remove impurities from the impure solvent stream. At the same time the bottoms product from the fractionator is substantially free of catalyst poisons. The feature of the use of much smaller volumes of adsorbent and operating these at higher throughput capacity and adsorption efficiency, it is stressed, results from the concept of seeking out the place at which the poisons accumulate and withdrawing these by withdrawing a small or minor portion of a solvent stream as a side draw product.

As a specific example of the invention, a used toluene stream enters fractionator 2 at a rate of 137 gallons per minute. The overhead reject stream 7 consists of 0.1 gallon per minute of water and isobutyl alcohol plus about 5 pounds per minute of hydrocarbon gases including butadiene and butenes. A side draw stream is removed from the fractionator at a point 5 trays below the top. Impurities such as water, isobutyl alcohol, tertiary butyl alcohol, organic halides, etc., are concentrated in toluene in the side draw stream which is removed at the rate of 3 gallons per minute. The side draw stream is passed through adsorber 16 containing silica gel which removes the impurities and allows only purified toluene to exit the adsorber. Bottoms product from the fractionator, which contains toluene with only a trace of impurities, is removed at the rate of 133 gallons per minute, added to the pure toluene from adsorber 16, and the mixture passed through adsorber 10 containing activated alumina for final removal of trace impurities. It is thus seen that most of the impurities in the feed stream are removed in adsorber 16 at a feed rate of only 3 gallons per minute. Without the invention, the impurities would have to be removed from fractionator bottoms product 9 at rate of about 130 gallons per minute with some loss of toluene overhead.

While the invention has been described in connection with the purification of a solvent stream used in the catalytic polymerization of butadiene to produce a rubber product, it may also be used to purify solvents used in other catalytic reactions. As another specific example, impure cyclohexane having been used as solvent in the polymerization of ethylene to form polyethylene as described in U.S. Patent 2,825,721 is passed to fractionator 2 at a rate of 300 gallons per minute. The fractionator rejects water overhead at the rate of 0.3 gallon per minute and 5 cubic feet per minute of light gases such as ethylene, air, etc. Impurities such as carbonyl and ketone type compounds are concentrated in cyclohexane and removed as the side-draw stream 15 at a rate of 6 gallons per minute. This stream is passed through adsorber 16 containing silica gel which permits only pure cyclohexane to exit via line 17. Essentially pure cyclohexane is removed as bottoms product 9 from the fractionator at the rate of 293 gallons per minute, added to stream 17, and the combined streams passed through activated alumina adsorber 10 for removal of trace impurities.

Reasonable variation and modification are possible within the scope of the foregoing disclosure, drawing and the appended claims to the invention the essence of which is that in the purification of a solvent which has been used in the catalytic polymerization of a hydrocarbon wherein said solvent is passed to a fractionation zone for removal overhead of catalyst poisons tending to accumulate therein and recovering the solvent as bottoms product, there is removed as a side draw stream at a place at which catalyst poisons tend to accumulate in the column and where desired this side draw stream is treated for removal of catalyst poisons therefrom and then recombined with the bottoms product for further reuse.

We claim:

1. In the method of producing at least 85% cis-polybutadiene containing product employing an iodine containing catalyst comprising an organo-metal and a titanium compound and a solvent, purifying this solvent to remove water and other catalyst poisons therefrom which comprises supplying used solvent to a fractionation zone at an intermediate point thereof, removing a major portion of water as a low-boiling vaporous product from the fractionation zone, removing a major portion of solvent from the fractionation zone as a high boiling product and removing a minor stream of solvent containing said catalyst poisons from a point intermediate the points at which the low-boiling vaporous product is removed from the fractionation zone and at which the high-boiling product is removed therefrom.

2. A method according to claim 1 wherein the minor stream is passed at least in part to a treating zone for removal of catalyst poisons therefrom and is then returned to the operation for reuse as solvent together with said major portion of solvent.

3. A method according to claim 2 wherein the minor stream is treated by contacting the same with an adsorbent effective to remove said poisons.

4. A method according to claim 3 wherein the adsorbent is selected from alumina, silica gel, and molecular sieve.

5. A method according to claim 2 wherein the solvent is a solvent selected from aromatics, paraffins, and cycloparaffins.

6. A method according to claim 2 wherein the solvent is toluene.

7. A method according to claim 2 wherein the solvent is xylene.

8. A method according to claim 2 wherein the solvent is ethyl-benzene.

9. In the method of producing at least 85% cis-polybutadiene containing product employing an iodine containing catalyst comprising an organo-metal and a titanium compound and solvent, purifying the solvent to remove water and catalyst poisons therefrom which comprises the steps of supplying used solvent to a fractionation zone at an intermediate point thereof, removing a major portion of water as a low-boiling vaporous product from the fractionation zone, removing a major portion of solvent from the fractionation zone as a high-boiling product and removing a minor stream of solvent containing said catalyst poisons from a point intermediate the points at which used solvent is supplied to said zone and at which water is removed therefrom.

10. A method of purifying a solvent which has been utilized in a catalytic polymerization of at least 85% cis-polybutadiene using an iodine-containing catalyst comprising an organometal and a titanium compound wherein the solvent has accumulated materials poisonous to the catalyst which is employed which comprises passing said solvent to a fractionization zone, fractionating from said solvent a major portion of water as a low-boiling vaporous product, fractionating from said solvent a high-boiling product essentially containing a major portion of said solvent, and removing from said fractionation zone as an intermediate fraction a minor stream containing said catalyst poisons at the place at which it is observed that the catalyst poisons tend to concentrate and separating said minor stream from the fractionation zone, purifying said minor stream, and returning said minor stream, now purified, to a place in the system at which said solvent has properties of said purified minor stream.

11. In the method of producing a cis-polybutadiene containing product by polymerizing 1,3-butadiene employing a catalyst containing a tri-alkylaluminum and titanium tetraiodide and a solvent, purifying this solvent to remove water and catalyst poisons therefrom which comprises supplying used solvent to a fractionation zone at an intermediate point thereof, removing a major portion of the water as a low-boiling vaporous product from the fractionation zone, removing a major portion of solvent from the fractionation zone as a high-boiling product and removing a minor stream of solvent containing said catalyst poisons from a point intermediate the points at which the low-boiling product is removed from the fractionation zone and at which the solvent is removed therefrom.

12. A method according to claim 11 wherein said solvent is selected from aromatics, paraffins, and cycloparaffins.

13. A method for the polymerization of 1,3-butadiene to form a rubbery polymer product containing at least 85% cis 1,4-addition polymer which comprises polymerizing 1,3-butadiene in the presence of a catalyst consisting essentially of a compound corresponding to the formula $R_3Al$, wherein R is an alkyl radical containing up to and including 6 carbon atoms and titanium tetraiodide employing an aromatic solvent and recovering polymer produced employing a material which is a catalyst poison and which material enters into the solvent, passing said solvent to a fractionation zone, in said zone fractionating from said solvent a fraction comprising substantially only solvent at one end of said fractionation zone, also fractionating from said solvent a fraction comprising substantially only water and further removing from said zone an intermediate fraction containing a high concentration of said material which tends to poison the catalyst.

14. A method according to claim 13 wherein the solvent is benzene.

References Cited by the Examiner

UNITED STATES PATENTS 2,615,901  10/1952  McClellan _____ 202—40
3,036,056  5/1962  Rion _____ 260—94.3
3,085,998  4/1963  Ross et al. _____ 260—94.9

JOSEPH L. SCHOFER, *Primary Examiner.*